(12) United States Patent
Besperstov (10) Patent No.: US 8,878,824 B2
(45) Date of Patent: Nov. 4, 2014

(54) FORCE-SENSING STYLUS POINTING DEVICE

(75) Inventor: Iouri Petrovitch Besperstov, Innisfil (CA)

(73) Assignee: BlackBerry Limited, Waterloo (CA)

( * ) Notice: Subject to any disclaimer, the term of this patent is extended or adjusted under 35 U.S.C. 154(b) by 177 days.

(21) Appl. No.: 13/444,044

(22) Filed: Apr. 11, 2012

(65) Prior Publication Data

US 2013/0271431 A1 Oct. 17, 2013

(51) Int. Cl.
*G06F 3/033* (2013.01)
(52) U.S. Cl.
USPC .......................................................... 345/179
(58) Field of Classification Search
CPC .............................. G06F 3/033; G06F 3/03545
USPC ......................................................... 345/179
See application file for complete search history.

(56) References Cited

U.S. PATENT DOCUMENTS

| | | | |
|---|---|---|---|
| 5,461,204 A | 10/1995 | Makinwa et al. | |
| 6,002,387 A * | 12/1999 | Ronkka et al. | 345/157 |
| 6,724,371 B1 | 4/2004 | Shenholtz et al. | |
| 6,744,426 B1 * | 6/2004 | Okamoto et al. | 345/179 |
| 7,176,906 B2 | 2/2007 | Williams et al. | |
| 7,342,350 B2 | 3/2008 | Toda | |
| 8,063,322 B2 | 11/2011 | Katsurahira | |
| 2001/0006369 A1 * | 7/2001 | Ely | 341/20 |
| 2003/0146906 A1 * | 8/2003 | Lin | 345/179 |
| 2003/0214490 A1 * | 11/2003 | Cool | 345/179 |
| 2005/0174259 A1 * | 8/2005 | Ely | 341/5 |
| 2008/0128180 A1 * | 6/2008 | Perski et al. | 178/18.03 |
| 2008/0150918 A1 * | 6/2008 | Hagen et al. | 345/179 |
| 2009/0078476 A1 * | 3/2009 | Rimon et al. | 178/18.03 |
| 2010/0207607 A1 | 8/2010 | Katsurahira et al. | |
| 2010/0212976 A1 * | 8/2010 | Baba | 178/19.01 |
| 2011/0115753 A1 | 5/2011 | Katsurahira | |
| 2011/0155479 A1 * | 6/2011 | Oda et al. | 178/18.06 |
| 2011/0157063 A1 * | 6/2011 | Yamamoto et al. | 345/173 |
| 2012/0068975 A1 * | 3/2012 | Wei et al. | 345/179 |

FOREIGN PATENT DOCUMENTS

| | | |
|---|---|---|
| EP | 0 307 667 | 3/1989 |
| EP | 0 622 753 | 11/1994 |
| EP | 0 718 750 | 6/1996 |
| WO | WO 88/05576 | 7/1988 |
| WO | WO 8805576 A1 * | 7/1988 |

OTHER PUBLICATIONS

European Search Report, EP12163809, Jul. 24, 2012.

* cited by examiner

*Primary Examiner* — Dwayne Bost
*Assistant Examiner* — Ivelisse Martinez Quiles (57) ABSTRACT

The present disclosure provides a force-sensitive stylus having a first electromagnetic coil located at a fixed position within a housing and a second electromagnetic coil that is attached to a moveable tip element and positioned to interact with the first electromagnetic coil, such that the position of the second electromagnetic coil relative to the first electromagnetic coil is dependent upon the force applied to the tip element. A control circuit energizes a transmitting coil of the first and second electromagnetic coils with a radio frequency signal and senses the current induced in the other coil to determine the force on the tip element. The force may be encoded in the radio frequency signal and then transmitted to a host electronic device by re-energizing the transmitting coil.

18 Claims, 5 Drawing Sheets

FORCE-SENSING STYLUS POINTING DEVICE

BACKGROUND

Stylus pointing devices are used to convey position information to a host electronic device. However, unlike a computer mouse that conveys relative motion, a stylus is designed to convey the absolute position of the stylus pen on a surface such as a tablet or screen. The position may be determined by a variety of methods, including detecting the interaction of the stylus with the electrical properties of the tablet (electromagnetic induction, electrical resistance, electrical capacitance), the optical properties of the tablet, or by ultrasonic location.

An active stylus has an ability to communicate with the host electronic device over a wired link or over a wireless communication link, such as a Radio-Frequency (RF) or Infrared (IR) link.

A stylus may be used in conjunction with a graphical user interface to enable user input to the host electronic device.

A common use of a stylus is to provide user input to a computer drawing or handwriting application. In this application the stylus is used both to draw lines and to interact with a user interface. For example, selection of the properties of the line is achieved by using a stylus to interact with a graphical user interface. Properties of a line to be drawn, such as the color or thickness of the line, may be selected by touching ('clicking') the stylus to a particular region of the screen or tablet. Alternatively, the color or thickness of a line may be selected by using the stylus to move a screen cursor to a particular region of the screen. A similar approach is used to select other properties of the line to be drawn.

It would be useful to provide a faster and more intuitive method for selecting line properties, such as line thickness, or other parameters.

BRIEF DESCRIPTION OF THE DRAWINGS

Example embodiments of the present disclosure will be described below with reference to the included drawings such that like reference numerals refer to like elements and in which.

DETAILED DESCRIPTION

In accordance with the various example embodiments presented herein, user interaction with a host electronic device is improved through use of a force-sensitive stylus.

For simplicity and clarity of illustration, reference numerals may be repeated among the figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein.

The present disclosure relates to a force-sensitive stylus having a first electromagnetic coil, located at a fixed position within a housing and a second electromagnetic coil attached to a tip element and positioned to interact with the first electromagnetic coil. The tip element extends from one end of the housing and is moveably coupled to the housing by a compliant element, such that the position of the second electromagnetic coil relative to the first electromagnetic coil varies in dependence upon the force applied to the tip element. In operation, a control circuit energizes one of the first and second electromagnetic coils (i.e., the transmitting coil) with a radio frequency signal and senses the other of the first and second electromagnetic coils (i.e., the receiving coil) to determine the force on the tip element based on the relative displacement between the transmitting coil and receiving coil. The radio frequency signal also provides a wireless link to a host electronic device and is used to communicate the applied force to the host electronic device.

Figure 1:
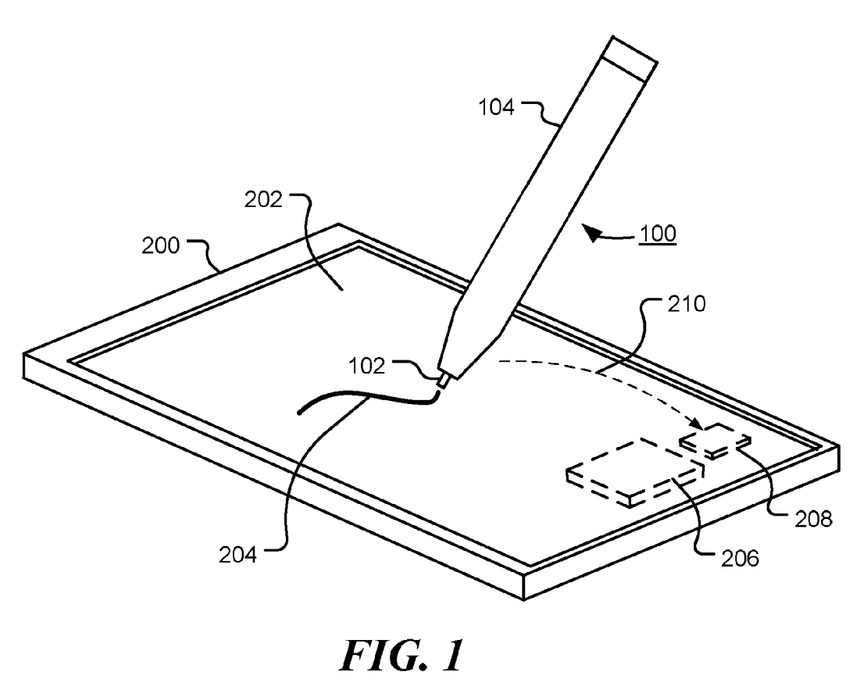
FIG. 1 is a diagram of a force-sensitive stylus and host electronic device, in accordance with various example embodiments of the present disclosure.

FIG. 1 is a diagram of a force-sensitive stylus and host electronic device, in accordance with various example embodiments of the present disclosure. Referring to FIG. 1, the force-sensitive stylus 100 is operable to interact with a host electronic device 200. In operation, the position of the stylus tip element 102, which extends from the elongated housing 104 of the stylus 100, relative to the surface of the host electronic device is detected and may be used to control the host electronic device. Detecting the positioning of the stylus may be performed by active means, where the stylus emits a signal that is detected by sensors in the host electronic device 200 or by passive means, where stylus interacts with a capacitive or resistive screen. Alternatively, the stylus may detect signals emitted from sources in the host electronic device. The signals may be, for example, electromagnetic, acoustic, optical, or a combination thereof. Various position detection methods are known, or will be apparent, to those of ordinary skill the art.

In one embodiment, the upper surface 202 of the host electronic device comprises a visual display screen. An image 204 may be displayed on the visual display screen 202 dependent upon the position of the tip element 102. The image 204 may be, for example, a line showing the current and prior positions of the tip element, or a cursor showing the current position of the tip element.

In a further embodiment, the host electronic device 200 comprises a drawing tablet that is operative linked to a computer or other host electronic device.

The host electronic device 200 incorporates a processor 206, an RF (radio frequency) communication receiver 208 plus auxiliary components (not shown) such as memory and clocks and associated components. The host electronic device may be, for example, a tablet computer, a laptop computer, a drawing table, a computer screen, a PDA, a mobile telephone, a gaming device, an electronic reader, a television screen, or other portable device.

The RF communication receiver 208 is configured to receive RF signals 210 from a transmission coil in the stylus 100.

In a further embodiment, the host electronic device comprises a position detection device that receives and/or transmits signals from the stylus 100. These signals may be used to locate the position of the stylus using techniques known to those of ordinary skill in the art. The position detection device may be linked to a computer or other host electronic device.

In some embodiments, the position of the tip element 102 provides an input to a computer program executing on a processor 206 of the host electronic device 200, or on a processor operatively coupled to the host electronic device 200. A common use for a stylus is for controlling a drawing tool in a computer-implemented drawing system. In this application, the stylus 100 replaces drawing tools such as pens and brushes commonly used for drawing. Since the stylus 100 may be used to control a variety of different drawing tools, a user is provided with methods for selecting different tools and for selecting the properties of those tools. Pen tool properties include line width and color, while brush tool properties additionally include opacity, grain, angle, jitter, re-saturation, bleed, flow, and depth. These properties are typically selected by user interaction with a graphical user interface displayed on the visual display screen.

When using a physical drawing tool, such as a brush or nibbed pen, the width of the line drawn may be continually varied by altering the force on the tool. Such continual variation cannot be readily achieved in an electronic environment through interaction with a graphical user interface.

For a stylus to more closely simulate a physical drawing tool, it is desirable to detect the applied pressure of the stylus on the display screen, and communicate that information to the computer application such that properties of elements generated on the display screen are controlled through variations in the applied pressure.

Figure 2:
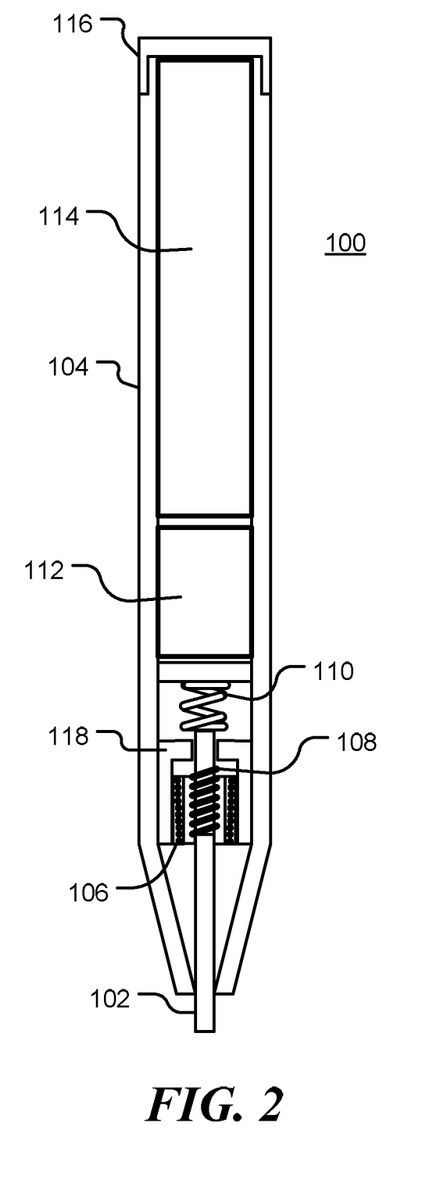
FIG. 2 shows a cross-section through a force-sensitive stylus, in accordance with various example embodiments of the present disclosure.

FIG. 2 shows a cross-section through a force-sensitive stylus 100, in accordance with various example embodiments of the present disclosure. Referring to FIG. 2, the force-sensitive active stylus 100 has a tip element 102 that extends from one end of an elongated housing 104. The tip element 102 is moveably coupled to the elongated housing 104 by a compliant element 110. A first electromagnetic coil 106 is located at a fixed position within the elongated housing 104 and a second electromagnetic coil 108 is attached to the tip element. The second electromagnetic coil 108 is positioned to interact with the first electromagnetic coil 106, such that the position of the second electromagnetic coil 108 relative to the first electromagnetic coil 106 is dependent upon the force applied to the tip element 102. In operation, force on the tip element 102 causes the compliant element 110 to be compressed so that the relative positions of the coils and the length of the second electromagnetic coil 108 located within the first electromagnetic coil 106 are altered.

Compliant element 110 is shown as a coil spring in FIG. 2, but other springs may be used. Alternatively, the spring may be replaced with a compliant material, such as synthetic on natural rubber.

When an electric current is supplied to one coil of the first and second electromagnetic coils, an electromagnetic field is generated. The energized coil will be referred to as the transmitting coil. The electromagnetic field, in turn, induces a current in the other electromagnetic coil, which will be referring to as the "receiving" or "sensing" coil. The induced current depends, at least in part, on the position of the receiving coil relative to the transmitting coil. In FIG. 2, the second (sensing or receiving) coil is shown as located inside and in concentric alignment with the first (transmitting) coil. In an alternative embodiment the first (fixed) coil is located inside and in concentric alignment with the second (moving) coil. The outer coil may be used as the transmitting coil. Other coil arrangements may be used without departing from the present invention.

A control circuit 112 is operatively coupled to the first and second electromagnetic coils and is configured to sense the force applied to the tip element 102 by sensing the current, or a signal dependent upon the current, induced in the receiving coil. This current depends upon the relative positions of the first and second electromagnetic coils, which, in turn, depends upon the force applied to the tip element 102.

In accordance with one aspect of the present disclosure, the fixed coil 106 is used transmit a signal dependent upon the relative positions of the first and second electromagnetic coils to a receiver in the host electronic device (such as 208 shown in FIG. 1). The transmitted signal comprises a radio frequency (RF) signal in which the force measurement is encoded using Frequency Shift Keying (FSK), Phase Shift Keying (PSK) or other coding means. Many such coding schemes are known to those of ordinary skill in the art. In order to transmit the signal, the transmitting coil is energized. The signal transmission induces a current in the receiving coil that can then be sensed to provide a new force measurement. Thus, the transmitting coil is used both as a communication means and as a force sensing means.

In one embodiment, the force sensitive stylus 100 is powered by battery 114 located within the elongated housing 104. The battery 114 may be accessed via screw cap 116, for example.

In order to maintain correct alignment between the two electromagnetic coils, a guide 118 may be used. The guide 118 may fixed to the elongated housing 104 and allow the tip element 102 to slide through it, or the guide 118 may be fixed to the tip element 102 and be in sliding contact with the interior of the elongated housing 104.

Figures 3A, 3B:
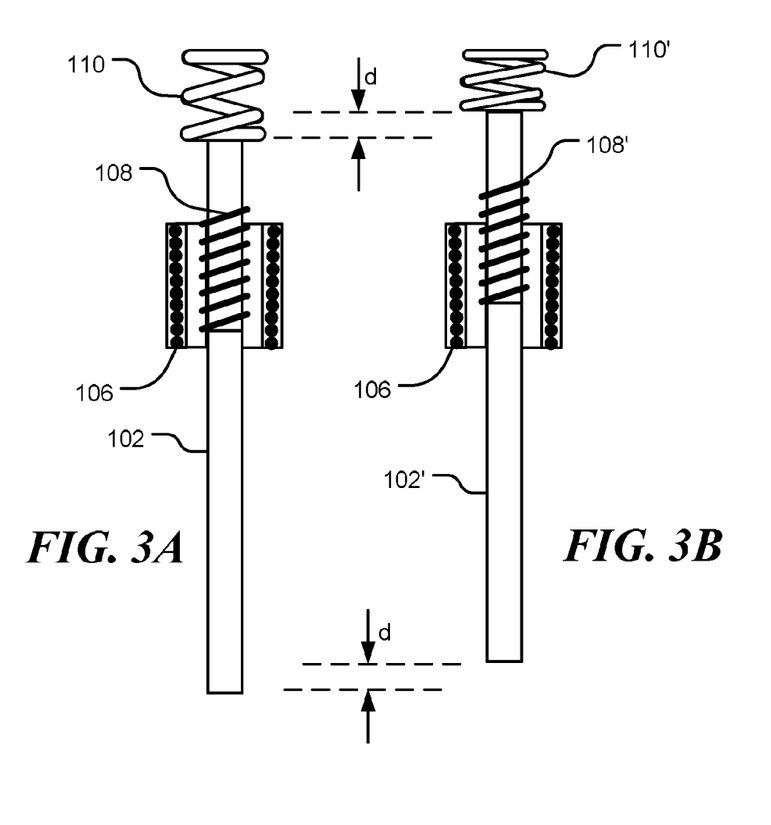
FIG. 3A and FIG. 3B are diagrams illustrating operation of a force-sensitive stylus, in accordance with various example embodiments of the present disclosure.

FIGS. 3A and 3B are diagrams illustrating operation of a force-sensitive stylus, in accordance with various example embodiments of the present disclosure. FIG. 3A shows a spatial relationship between a first electromagnetic coil 106 and a second electromagnetic coil 108 when low, or zero, force is applied to the lower end of stylus tip element 102. In this case there is little or no compression of the compliant element 110, since the compression of the compliant element 110 is substantially proportional to the force applied to it by the tip element 102. As a force is applied to the tip element 102, the compliant element is compressed to a compressed configuration denoted by 110' in FIG. 3B. The amount of deflection, denoted as d in the figures, is proportional to the increase in the force applied to the tip element and inversely proportional to the stiffness of the compliant element. The tip element, shown as 102' in FIG. 3B, and the second electromagnetic coil, shown as 108' in FIG. 3B, are similarly displaced by an amount d relative to the first electromagnetic coil 106. In one embodiment, the fixed coil 106 is energized to generate a magnetic field. The current induced in the second coil 108 is proportional to the length of the coil in the magnetic field. In FIG. 3A, the length of the second coil in the magnetic field is denoted as L. In FIG. 3B the length is reduced by an amount d. The induced current is reduced, approximately, by an amount $\delta I$ which is approximately related to the displacement d and to the change in force $\delta F$ by $$\delta I = \frac{d}{L} I = \delta F \cdot \frac{I}{KL}, \quad (1)$$

where δF is the increase in the force applied to the tip element and K is the spring constant for the compliant element 110. Thus, the change in force, δF, is related to the change in current, δI, by $$\delta F = \delta I \frac{KL}{I}, \quad (2)$$

The change in force is proportional to the change in current, δI. The spring constant K may be chosen to control the range of movement of the tip element relative to the elongated housing. In practice, because of the complexity of the magnetic field at the end of the transmitting coil for example, the relation is more complex, but may be determined by a calibration procedure.

In one embodiment, the current is determined by measuring the voltage across a resistor. Since the induced current is a high frequency alternating current, a quantity related to the amplitude of the induced current is measured.

An advantage of the disclosed stylus is that the force-sensing mechanism is substantially insensitive to temperature changes.

In one embodiment, the force signal to be transmitted is derived from the change in the current induced in the sensing coil.

Figure 4:
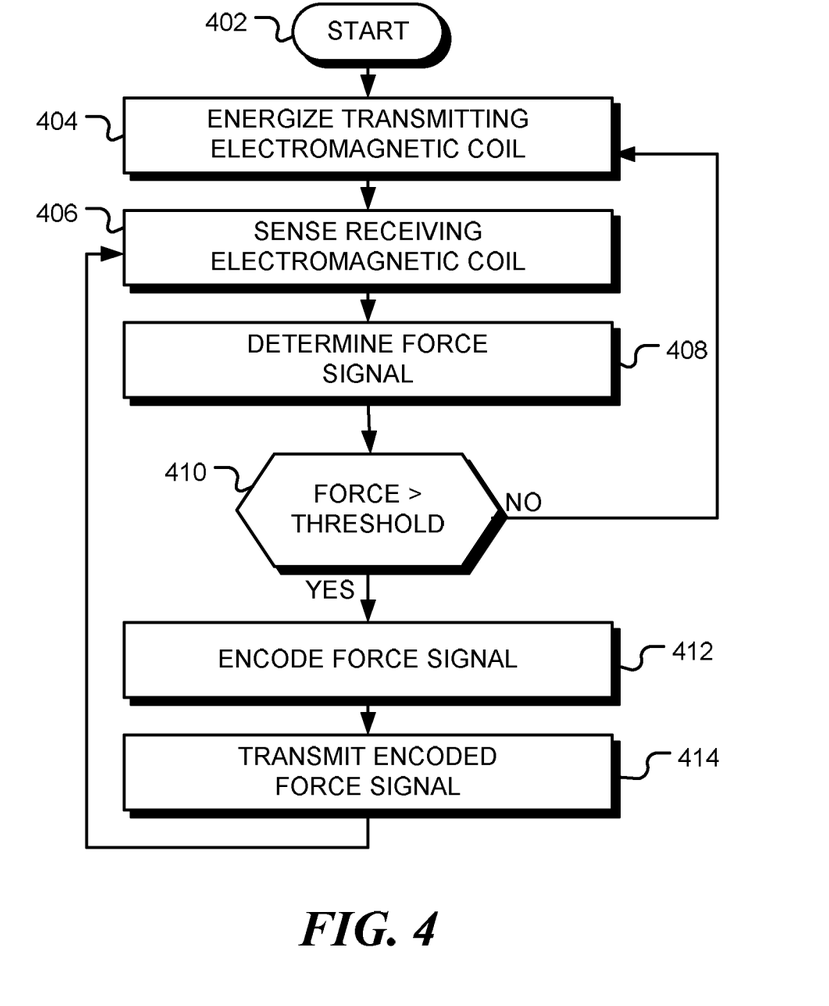
FIG. 4 is a flow chart of a method for sensing stylus force, in accordance with various example embodiments of the present disclosure.

FIG. 4 is a flow chart of an example method for sensing a force on a tip element that extends from an end of a stylus and is coupled to the stylus via a compliant element. Flow begins at start block 402. At block 404 a transmitting electromagnetic coil is energized by passing a current through it. At block 406, the amplitude of the current induced in the receiving electromagnetic coil is sensed. At block 408, the force on the stylus is determined from the amplitude of the sensed current. If the force is greater than a given threshold, as depicted by the positive branch from decision block 410, the force signal is encoded at block 412 and transmitted to a host electronic device at block 414. Since transmission is achieved by re-energizing the transmitting electromagnetic coil, flow then returns to block 406. The transmission from the transmitting coil induces a current in the sensing or receiving coil. If the force is below the given threshold, as depicted by the negative branch from decision block 410, flow returns to block 404 and the process continues. In order to preserve battery power when the stylus is not in use, the process may be repeated at a lower rate when the force is below the threshold, and, optionally, a lower energizing current may be used.

The transmitted signal may comprise an encoded digital representation of the force measurement. Once received at an input of the host electronic device, the signal is used to control operation of the host electronic device. In one embodiment a property of a line (such as its thickness) displayed on a screen of the host electronic device is adjusted dependent upon the received force signal.

Figure 5:
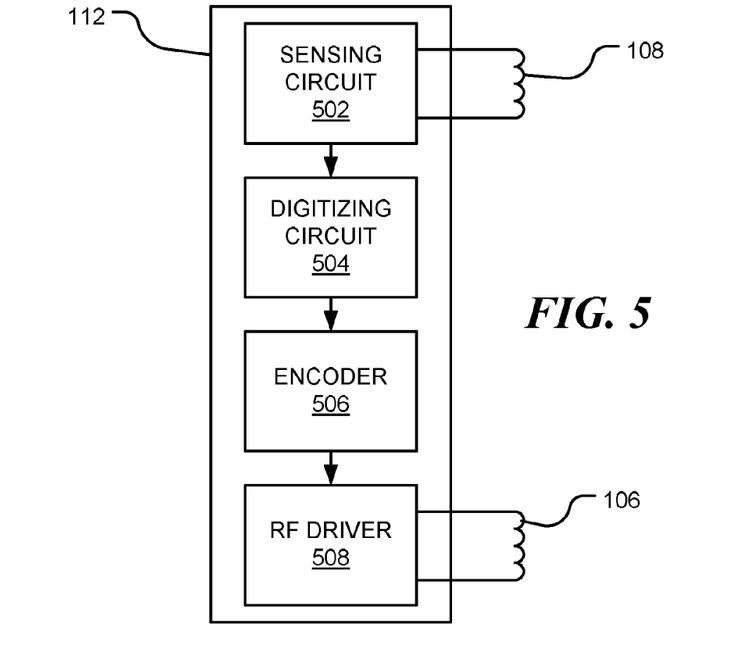
FIG. 5 is a block diagram of a stylus control circuit, in accordance with various example embodiments of the present disclosure.

FIG. 5 is a block diagram of a stylus control circuit, in accordance with various example embodiments of the present disclosure. Referring to FIG. 5, the control circuit 112 includes a sensing circuit 502 that receives input from the receiving or sensing coil 108 of the stylus. The sensing circuit outputs a signal dependent upon the force applied to the stylus tip element to a digitizing circuit 504. The digitized signal is then passed to an encoder 506. In some embodiments, the amplitude of the encoded signal is held constant to facilitate force sensing. For example, the encoder may use frequency shift keying or phase shift keying. The encoded force signal is passed to an RF driver circuit 508 that produces an RF signal to drive the transmitting coil 106. The electromagnetic field produced by the transmitting coil 106 induces a current in the receiving coil 108, which is sensed by the sensing circuit 502. The process of driving the coil 106 and sensing the coil 108 is repeated to provide regular measurements of the force applied to the stylus tip element.

Figure 6:
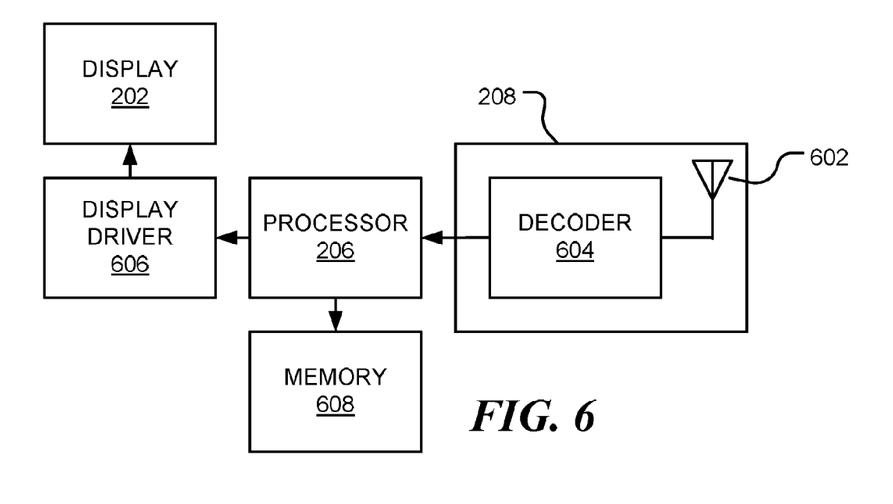
FIG. 6 is a block diagram of a circuit of a host electronic device in accordance with various example embodiments of the present disclosure.

FIG. 6 is a block diagram of a circuit of a host electronic device in accordance with various example embodiments of the present disclosure. As described above in reference to FIG. 5, the transmitting coil of the stylus is driven by an RF signal and produces an electromagnetic field. This field may be sensed by a host processor. Referring now to FIG. 6, the electromagnetic field from the stylus is detected at antenna 602 of the RF receiver 208 of the host electronic device. The resulting signal is decoded in decoder 604 and the decoded force signal is passed to the processor 206 of the host electronic device. The force signal is used to control operation of the processor. In particular, the force signal may be used as an input to drawing on writing software application executed on the processor. For example, the force signal could be used to control the width of a line produced by a drawing application. The output from the application (an electronic drawing for example) may be passed to a display driver 606 and displayed on a screen 202 of the host electronic device. The output from the application may be stored in a memory 608. The memory may be local to the device or remote from it and connected via a communication link.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described example embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A force-sensitive stylus comprising:
a housing;
a first electromagnetic coil located at a fixed position within the housing;
a compliant element;
a tip element extending from one end of the housing and moveably coupled to the housing by the compliant element;
a second electromagnetic coil attached to the tip element and positioned to interact with the first electromagnetic coil, the position of the second electromagnetic coil relative to the first electromagnetic coil dependent upon a force applied to the tip element; and
a control circuit operable to:
energize a transmitting coil of the first and second electromagnetic coils with a radio frequency signal;
sense a signal associated with a receiving coil of the first and second electromagnetic coils and determine the force on the tip element, and
encode the determined force in the radio frequency signal,
wherein the transmitting coil is operable to both excite the receiving coil and communicate the force to a host electronic device.

2. A force-sensitive stylus in accordance with claim 1, wherein the encoded force comprises a digit representation of the determined force.

3. A force-sensitive stylus in accordance with claim 2, wherein the radio frequency signal is encoded using Frequency Shift Keying (FSK).

4. A force-sensitive stylus in accordance with claim 1, wherein the control circuit is operable to determine the amplitude of a current induced in the receiving coil by energizing the transmission coil.

5. A force-sensitive stylus comprising:
a housing;
a first electromagnetic coil located at a fixed position within the housing;
a compliant element;
a tip element extending from one end of the housing and moveably coupled to the housing by the compliant element;
a second electromagnetic coil attached to the tip element and positioned to interact with the first electromagnetic coil, the position of the second electromagnetic coil relative to the first electromagnetic coil dependent upon a force applied to the tip element; and
a control circuit operable to energize a transmitting coil of the first and second electromagnetic coils with a radio frequency signal and further operable to sense a signal associated with the receiving coil of the first and second electromagnetic coils and determine the force on the tip element,
wherein the transmitting coil comprises the first electromagnetic coil and the receiving coil comprises the second electromagnetic coil, and wherein the second electromagnetic coil is in concentric alignment with the first electromagnetic coil.

6. An electronic device comprising:
a processor;
a display screen controllable by the processor;
a stylus operable to provide force data to the processor, the stylus having first and second electromagnetic coils configured such that relative displacement between the first and second electromagnetic coils is dependent upon a force applied on a tip element of the stylus, and further configured such that a transmitting coil of the first and second coils is energized with a radio frequency signal in which force data is digitally encoded;
a radio frequency communication receiver operatively coupled to the processor and operable to detect an electromagnetic field of the transmitting coil and to decode the radio frequency signal to recover the force data;
the processor operable to render an image on the display screen dependent upon the force data and position of the tip element of the stylus.

7. An electronic device in accordance with claim 6, wherein the stylus comprises:
a housing;
a compliant element that moveably couples the tip element to the housing such that the tip element extends from one end of the housing; and
a control circuit operable to energize the transmitting coil of the first and second electromagnetic coils with the radio frequency signal and further operable to sense a signal associated with the receiving coil of the first and second electromagnetic coils and thereby determine the force on the tip element;
wherein the transmitting coil communicates the force data to the radio frequency receiver.

8. An electronic device in accordance with claim 7, wherein:
the first electromagnetic coil is located at a fixed position within the housing; and
the second electromagnetic coil is attached to the tip element and positioned to interact with the first electromagnetic coil, such that the position of the second electromagnetic coil relative to the first electromagnetic coil is dependent upon the force applied to the tip element.

9. An electronic device in accordance with claim 7, wherein the processor is operable to render a line on the visual display screen, the position of the line being dependent upon the position of the stylus on the visual display screen, and the thickness of the line being dependent upon the radio frequency signal transmitted from the force-sensitive stylus.

10. A method for sensing a force on a tip element that extends from an end of a stylus and is moveably coupled to the stylus via a compliant element, the method comprising:
passing a radio frequency signal through a first electromagnetic coil;
sensing an electrical current induced in a second electromagnetic coil;
determining the force on the tip element dependent upon the induced electrical current;
adjusting the radio frequency signal to encode the determined force on the tip element into the radio frequency signal, and
communicating the determined force to a host electronic device using the first electromagnetic coil;
where one of the first and second electromagnetic coils is located at a fixed position within the stylus and the other coil of the first and second electromagnetic coils is coupled to the tip element.

11. A method in accordance with claim 10, wherein determining the force on the tip element dependent upon the second electrical current comprises determining the amplitude of the induced electrical current.

12. A method in accordance with claim 10, wherein adjusting the radio frequency signal, dependent upon the force on the tip element comprises:
- forming a digital representation of the force dependent upon the sensed electrical current; and
- encoding the digital representation.

13. A method in accordance with claim 10, further comprising:
- receiving the radio frequency signal at an RF receiver of a host electronic device; and
- controlling operation of the host electronic device dependent upon the received radio frequency signal.

14. A method in accordance with claim 13, wherein controlling operation of the host electronic device dependent upon the received radio frequency signal comprises:
- adjusting a property of a line displayed on a screen of the host electronic device dependent upon the received radio frequency signal.

15. A method in accordance with claim 13, wherein controlling operation of the host electronic device dependent upon the received radio frequency signal comprises:
- adjusting the thickness of a line displayed on a screen of the host electronic device dependent upon the received radio frequency signal.

16. A method in accordance with claim 10, wherein adjusting the radio frequency signal dependent upon the force on the tip element comprises encoding a value dependent upon the force using frequency shift keying.

17. A method in accordance with claim 10, wherein the radio frequency signal has constant amplitude.

18. A method in accordance with claim 10, further comprising repeating the passing, the sensing, the determining and the adjusting elements.

* * * * *